United States Patent
Simchak et al.

(10) Patent No.: US 9,108,566 B2
(45) Date of Patent: Aug. 18, 2015

(54) MULTI-PATTERN HEADLAMP ASSEMBLY AND SYSTEM

(71) Applicant: Federal-Mogul Corporation, Southfield, MI (US)

(72) Inventors: Jeffrey Simchak, Dexter, MI (US); Xiaolu Chen, Saline, MI (US); John Dominick, Cookeville, TN (US)

(73) Assignee: Federal-Mogul Corporation, Southfield, MI (US)

( * ) Notice: Subject to any disclaimer, the term of this patent is extended or adjusted under 35 U.S.C. 154(b) by 183 days.

(21) Appl. No.: 13/803,337

(22) Filed: Mar. 14, 2013

(65) Prior Publication Data
US 2014/0268837 A1    Sep. 18, 2014

(51) Int. Cl.
| | |
|---|---|
| B60Q 1/04 | (2006.01) |
| B60Q 1/12 | (2006.01) |
| B60Q 1/14 | (2006.01) |
| B62J 6/02 | (2006.01) |
| F21S 8/10 | (2006.01) |

(52) U.S. Cl.
CPC *B60Q 1/12* (2013.01); *B60Q 1/143* (2013.01); *B62J 6/02* (2013.01); *F21S 48/1731* (2013.01); *B60Q 2300/112* (2013.01); *B60Q 2300/114* (2013.01); *B60Q 2300/122* (2013.01); *B60Q 2300/136* (2013.01); *B60Q 2300/146* (2013.01); *B60Q 2300/32* (2013.01); *B60Q 2300/42* (2013.01)

(58) Field of Classification Search
CPC .... F21S 48/14; F21S 48/1726; F21S 48/1731
USPC .............................. 362/466, 510, 539; 701/49
See application file for complete search history.

(56) References Cited

U.S. PATENT DOCUMENTS

| | | | |
|---|---|---|---|
| 4,870,545 A | 9/1989 | Hatanaka et al. | |
| 4,875,141 A | 10/1989 | Miyauchi et al. | |
| 4,985,816 A | 1/1991 | Seko et al. | |
| 5,161,875 A | 11/1992 | Sekiguchi et al. | |
| 5,412,492 A | 5/1995 | Zammit et al. | |
| 5,426,571 A | 6/1995 | Jones | |
| 6,312,147 B2 * | 11/2001 | Eichler | 362/539 |
| 7,070,300 B2 | 7/2006 | Harbers et al. | |
| 7,072,096 B2 | 7/2006 | Holman et al. | |

(Continued)

OTHER PUBLICATIONS

International Search Report for PCT/US2014/026150, dated Jul. 8, 2014, 3 pages.

(Continued)

*Primary Examiner* — Peggy Neils
(74) *Attorney, Agent, or Firm* — Reising Ethington P.C.

(57) ABSTRACT

A vehicle headlamp system includes a headlamp assembly having a light source and a beam pattern panel. The beam pattern panel includes one or more regions capable of changing between opaque and transparent light-transmission states to selectively allow light from the light source to pass through the panel. The panel may be an LCD panel with a plurality of liquid crystal elements arranged in an array with the ability to provide a plurality of different beam patterns. The beam pattern may be determined and changed in real time based on information received at a system processor about one or more vehicle and/or road conditions. The headlamp system can direct a projected light beam into a curve in the road ahead and/or automatically change the direction of the projected beam to avoid shining light directly at oncoming drivers.

17 Claims, 5 Drawing Sheets

(56) References Cited

U.S. PATENT DOCUMENTS

| | | | |
|---|---|---|---|
| 7,347,595 B2* | 3/2008 | Brun et al. | 362/464 |
| 7,350,954 B2 | 4/2008 | Snider et al. | |
| 7,400,439 B2 | 7/2008 | Holman et al. | |
| 8,487,535 B2* | 7/2013 | Tani et al. | 315/82 |
| 8,523,417 B2* | 9/2013 | Kobayashi | 362/539 |
| 2006/0146552 A1 | 7/2006 | Shaffer | |
| 2010/0168966 A1 | 7/2010 | Tsujii et al. | |
| 2011/0013412 A1 | 1/2011 | Kobayashi | |
| 2011/0063864 A1* | 3/2011 | Brown et al. | 362/509 |
| 2013/0107559 A1* | 5/2013 | Gava | 362/516 |

OTHER PUBLICATIONS

Written Opinion for PCT/US2014/026150, dated Jul. 8, 2014, 9 pages.

* cited by examiner

MULTI-PATTERN HEADLAMP ASSEMBLY AND SYSTEM

TECHNICAL FIELD

This disclosure generally relates to vehicle headlamp systems and, in particular, to headlamp systems capable of providing more than one beam pattern.

BACKGROUND

Vehicle headlamp assemblies emit light at the front of a vehicle and may illuminate an area in front of the vehicle to help the driver see the road, road signs, obstacles, or other objects along a path of travel, especially in low ambient light conditions. Light emitted by vehicle headlamps may also alert other drivers or pedestrians to the presence of an oncoming vehicle. Some headlamp assemblies are capable of switching between low-beam and high-beam settings with the driver typically in control of which setting is appropriate. Each of the high and low beam settings may have an associated beam shape, intensity, and/or direction built into the headlamp assembly by the vehicle or headlamp manufacturer.

SUMMARY

According to one embodiment, there is provided a headlamp assembly for use with a vehicle headlamp system. The headlamp assembly includes a housing and a light source that provides light inside the housing. The headlamp assembly also includes a beam pattern panel at a fixed location relative to the housing. The panel has a light-receiving side positioned to receive light from the light source, and the panel includes a region that can be changed between opaque and transparent light-transmission states to selectively allow light to pass through the panel.

According to another embodiment, there is provided a headlamp assembly for use with a vehicle headlamp system. The headlamp assembly includes a housing and a light source that provides light inside the housing. The headlamp assembly also includes an LCD panel having one or more liquid crystal elements. Each of the liquid crystal elements is configured to be activated to allow or prevent transmission of light from the light source through the panel at the activated element(s).

According to another embodiment, there is provided a method of operating a vehicle headlamp system. The method includes the steps of: (a) directing light from a light source of a headlamp assembly toward an LCD panel so that at least some of the light impinges the panel; (b) receiving information at a headlamp system controller about a desired beam pattern for the panel; and (c) changing the light-transmission state of one or more liquid crystal elements of the LCD panel to provide the desired beam pattern.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF EXEMPLARY EMBODIMENTS

The vehicle headlamp system described herein is capable of adapting to various road and/or vehicle conditions with or without driver input. For example, the light beam projected in front of a vehicle equipped with the disclosed system may be customized for particular situations, such as the presence of an oncoming vehicle, an upcoming curve in the road, the amount of ambient light present, or other situations. The system may also simplify traditional high- and low- beam settings by elimination of moving parts in the headlamp assembly and/or elimination of the need for dual-intensity light sources. Though employable in a fully automated manner, in which vehicle situations are continuously monitored and beam patterns are continually adapted to fit the current situation, the headlamp system is also capable of receiving driver input to operate in a semi-automatic or manual mode.

Figure 1:
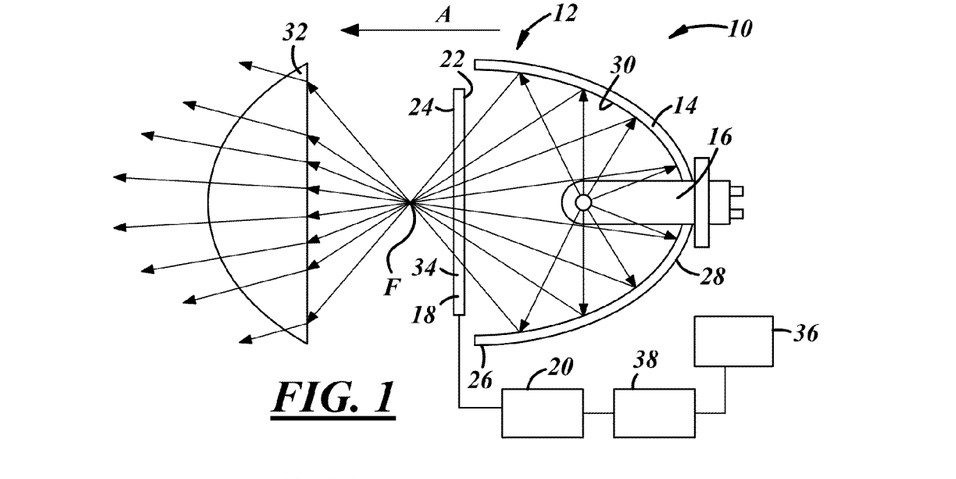
FIG. 1 is a schematic side view of one embodiment of a vehicle headlamp system.

With reference to FIG. 1, there is shown schematically a side view of a vehicle headlamp system 10, according to one embodiment. The illustrated system 10 includes a vehicle headlamp assembly 12 having a housing 14, a light source 16, a beam pattern panel 18, and a panel controller 20. The headlamp assembly 12 is adapted for attachment to a vehicle so that light from the light source 16 can illuminate an area in front of the vehicle, which is generally pointed in direction A.

The beam pattern panel 18 has a light-receiving side 22 and an opposite light emitting side 24. The light-receiving side 22 is positioned so that it receives light from the light source 16. In this example, the panel 18 is located in front of the light source 16, and the light-receiving side 22 is facing toward the light source. The light-emitting side 24 faces away from the light source 16 and toward the area in front of the vehicle. As described in greater detail below, under operation of the controller 20, the beam pattern panel 18 is capable of defining a beam pattern at the panel that ultimately affects one or more characteristics of the light beam projected in front of the vehicle.

The housing 14 may support other components of the system 10, such as the light source 16, the panel 18, and/or the controller 20. The housing 14 has opposite front and back ends 26, 28 and includes a reflective and concave inner surface 30 in this example. The inner surface 30 may have an elliptical or other curved profile with a focal point F. It should be understood that the view shown in FIG. 1 is only one view and that other views, such as a top view, may show a different profile for the inner surface with a different focal point or no particular focal point. Though not explicitly shown in FIG. 1, the housing 14 is typically closed off at the front end 26 to protect the inside of the housing from the environment. The panel 18, a lens, or a transparent housing wall may serve this function.

The light source 16 provides light inside the housing 14. In the illustrated example, the light source 16 is a light bulb with a portion that extends inside the housing 14 from the back end 28. The light source 16 can be any source of light capable of illuminating the area in front of the vehicle, including halogen or other filament-based lamps, xenon-arc lamps, fluorescent sources, LEDs, or fiber optics, to name a few. The assembly 12 may also include more than one light source 16. In one example, the light source is an array of LEDs, and each LED in the array may be independently illuminated. Light from the light source 16 impinges the panel 18 at the light-receiving side 22 and is selectively allowed to pass through the panel to the light-emitting side 24. Light may be emitted from the headlamp assembly 12 directly from the light-emitting side 24 of the panel 18, or light passing through the panel may travel through other mediums before being emitted from the assembly. For example, the headlight assembly 12 of FIG. 1 includes a lens 32 at the front end 26 of the housing 14 through which light passes to be emitted by the headlamp assembly. The lens 32 is positioned to receive light originating from the light source 16 and is configured to change the direction of at least some of the received light before the light is emitted from the headlamp assembly 12. In the example of FIG. 1, the lens 32 receives light from the light-emitting side 24 of the panel 18, changes the direction of at least some of the received light, and emits the light toward the area in front of the vehicle. The lens 32 may function to help shape the beam of light projected from the assembly 12 and can also receive light from the light source 16 that does not pass through the panel 18. The lens 32 can close off the front end 26 of the housing 14 to further define the inside of the housing. Lens 32 can be a projection lens and may be configured to diffuse, intensify and/or refract light passing therethrough.

The beam pattern panel 18 includes at least one region 34 that can be changed between opaque and transparent light-transmission states, through operation of the controller 20, to selectively allow light to pass through the panel. The panel 18 may be directly or indirectly supported by the housing 14 and may have a fixed location and/or orientation relative to the housing 14. Alternatively, the panel 18 may be configured to rotate, tilt, or otherwise move relative to the housing 14. In the illustrative example of FIG. 1, the panel 18 is fixed at a location between the light source 16 and the focal point F of the profile of inner surface 30.

Figure 2:
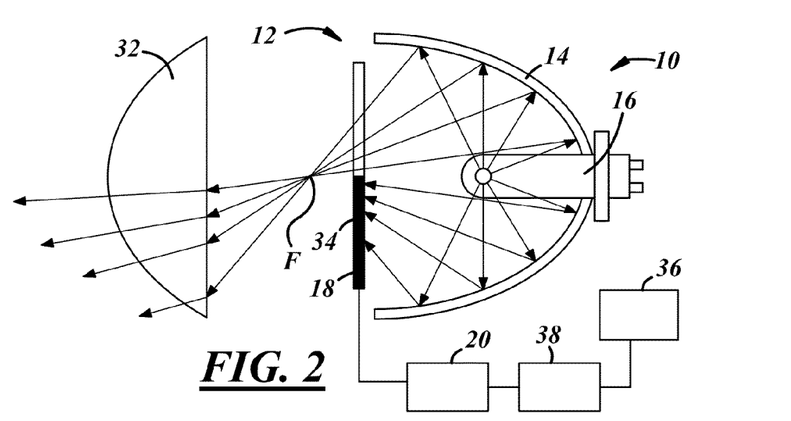
FIG. 2 is a schematic side view of the vehicle headlamp system of FIG. 1, showing a lower region of a beam pattern panel at an opaque light-transmission state.

FIG. 2 illustrates one mode of operation of the headlamp system 10, in which region 34 is a lower region of the panel 18. By operation of the controller 20, the lower region 34 of the panel 18 is changed from a transparent state (FIG. 1) to an opaque state (FIG. 2), thereby substantially preventing visible light—via reflection and/or absorption—from passing through the panel at the lower region 34 while continuing to allow light to pass through other regions of the panel. FIG. 2 may thus represent or correspond to a low-beam setting for the headlamp system 10, while FIG. 1 may represent or correspond to a high-beam setting for the headlamp system. As will be apparent from the figures, the panel 18 could alternatively be located in front of the focal point F, and region 34 could be a top region of the panel 18 to achieve a similar effect.

In one embodiment, the beam pattern panel 18 is an LCD panel and each changeable region 34 is defined at a liquid crystal element. LCD panels and their general principles of operation are known, where a voltage applied across a liquid crystal element between light-polarizing layers changes the light-transmission state at the energized or activated element from transparent to opaque, or vice-versa. Other types of LCD panels, such as high-transparency LCD panels, may be employed and may have different principles of operation. Individual liquid crystal elements can be any shape and/or size as defined by the shape and size of the energizing electrode in the layered structure. Thus, the panel 18 could include a single liquid crystal element or plurality of liquid crystal elements. In one embodiment, the LCD panel 18 includes a plurality of liquid crystal elements arranged in an array capable of providing a plurality of different beam patterns so that light can be emitted at the light-emitting side 24 of the panel in a plurality of patterns. In another embodiment, the LCD panel 18 is configured to prevent transmission of light at each LCD element when the element is activated—i.e., application of a voltage across the element places the element in the opaque state. This may represent a fail-safe mode in which the headlamp assembly 12 can still provide light in the event that electrical power to the panel 18 is interrupted, particularly in implementations where all or nearly all of the light from the light source 16 must pass through liquid crystal elements of the panel to be emitted from the assembly.

Figure 3:
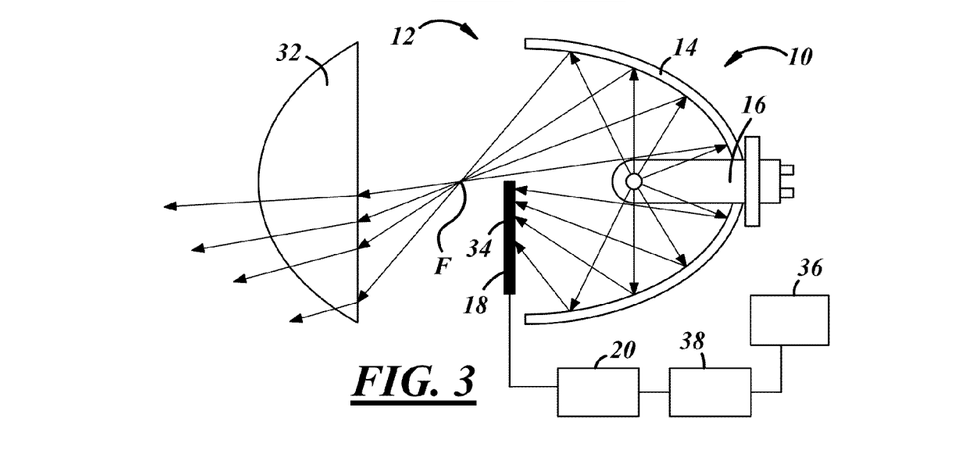
FIG. 3 is a schematic side view of another embodiment of the vehicle headlamp system, where some of the light from a light source bypasses the beam pattern panel.

In another arrangement, shown in FIG. 3, the panel 18 is positioned so that at least some of the light from the light source 16 bypasses the panel. In this arrangement, the light that bypasses the panel is unaffected by the light-transmission state of panel 18 regions and is always emitted by the headlight assembly 12 when the light source 16 is powered. Placing region 34, which is essentially the entire panel 18 in this particular example, in the opaque state may correspond to a low-beam setting, and placing region 34 in the transparent may correspond to a high-beam setting. The smaller panel 18 of FIG. 3 may also be an LCD panel with any number of liquid crystal elements and can be configured to provide a plurality of different beam patterns. In embodiments where at least some of the light from the light source 16 bypasses the panel 18, a different fail-safe mode is possible in which the LCD panel 18 is configured to allow the transmission of light at each LCD element when the element is activated. In other words, in the case of electrical power interruption at the LCD panel 18, light continues to be emitted by the headlamp assembly 12 at the low-beam setting only.

It is contemplated that beam pattern panels other than LCD panels may be employed. For example, other types of electrically-controllable materials and/or layered constructions may be devised that do not necessarily include liquid crystal materials but that function similarly. Or the panel 18 could include an array of individually controllable light shutters, such as electromechanical shutter mechanisms, to achieve a plurality of beam patterns. In addition, although the illustrated panel 18 is generally flat, it may include one or more contours or may be provided in some other non-flat form. For example, while traditional LCD panels include rigid glass layers, it is foreseeable that flexible LCD materials may be developed.

Figure 3A:
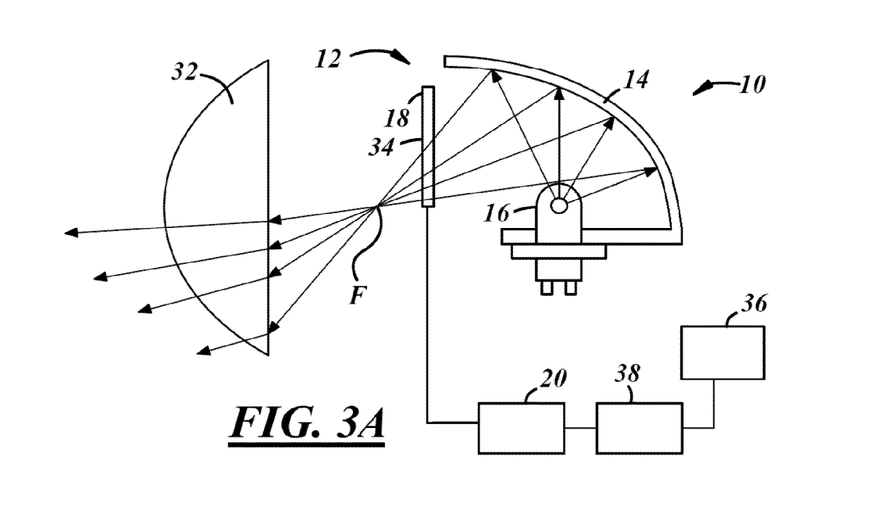
FIG. 3A is a schematic side view of another embodiment of the vehicle headlamp system with a different housing and light source arrangement.

FIG. 3A is a schematic side view of another embodiment of the vehicle headlamp system 10 with a different housing 14 and light source 16 arrangement. In this example, the housing 14 is not symmetric about a horizontal axis as it is in the previous figures, and the light source 16 is supported by the housing in a different manner. As with the previous examples, the panel 18 includes one or more changeable regions 34, controllable to affect light transmission through the panel and from the headlamp assembly 12.

Figure 3B:
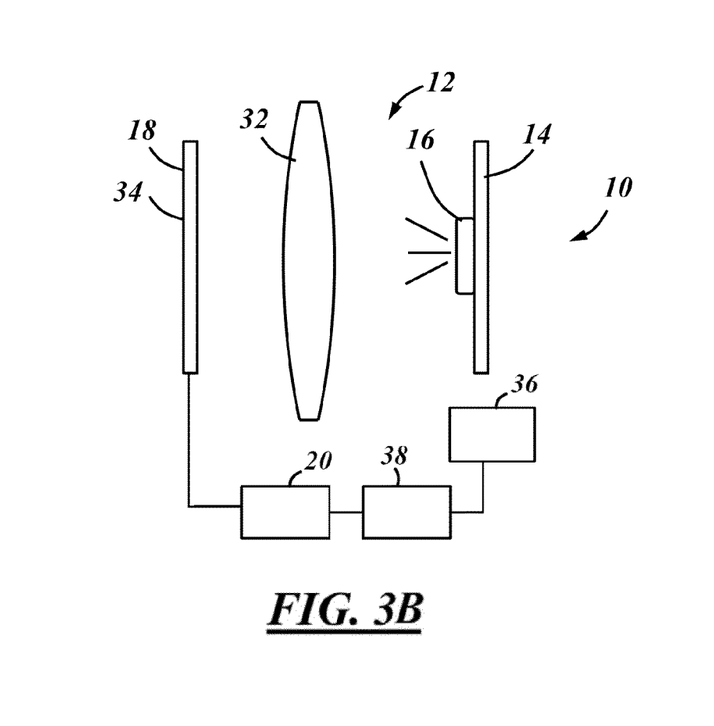
FIG. 3B is a schematic side view of another embodiment of the vehicle headlamp system, where the lens is located between the light source and the beam pattern panel.

FIG. 3B is a schematic side view of another embodiment of the vehicle headlamp system 10, where the lens 32 is located between the light source 16 and the beam pattern panel 18. Only a portion of the housing 14 is shown in this example, and the light source 16 is an LED mounted to the housing. As with the previous examples, the light source 16 can be any type of light source. The lens 32 shown in FIG. 3B is a double-convex lens, with light from the light source 16 being received by one convex side of the lens and emitted from an opposite convex side toward the panel 18. The examples of FIGS. 3A and 3B are not shown with any changeable region 34 in an opaque state and are provided to illustrate that a variety of combinations, arrangements, shapes, and locations of system 10 components can be implemented consistent with the teachings presented herein.

The panel controller 20 shown in FIGS. 1-3B controls the light-transmission state of each changeable region 34 of the panel 18. For example, the controller 20 may be capable of providing an electrical voltage or signal to each region 34 to independently activate each region when desired. The controller 20 may be a simple electrical switch, a multi-microprocessor control board, or any other type of controller capable of changing the light-transmission state of panel 18 regions. In one embodiment, the controller 20 is a user-actuated electrical switch through which voltage is applied to the desired region(s) of the panel 18. This may be useful in configurations with a single changeable region 34 or a plurality of changeable regions that are configured to be changed simultaneously. For example, the vehicle driver could actuate a switch to directly change the lower region 34 of the panel 18 from transparent to opaque with no further electronic control necessary. A more complex controller including a microprocessor and/or other electronic circuitry may be used with where panel 18 is an LCD panel having an array of liquid crystal elements. An active or passive matrix LCD controller may receive information about the desired light-transmission state of each region 34 in the array (i.e., each liquid crystal element or pixel) and activate the appropriate region(s) in response.

The vehicle headlamp system 10 may also include a sensor 36 that collects, measures, or monitors a road or vehicle condition. Some non-limiting examples of useful sensors include a turning angle sensor, an oncoming light sensor, an accelerometer, a vision system, a road hazard sensor, or a motorcycle roll sensor. Information obtained by the sensor 36 may be used to determine the shape and/or location of the desired beam pattern to be provided at the panel 18. In the illustrated example, the system 10 includes a processor 38 that receives information from the sensor 36. The processor 38 may also be capable of receiving information and processing information from more than one sensor. The processor 38 may use information from the sensor(s), from driver input, and/or from other sources to select the desired beam pattern and provide information about the desired beam pattern to the panel controller 20 to change the light-transmission state of one or more regions 34 of the panel 18 as necessary. The processor 38 may select from a number of pre-determined beam patterns and/or may be programmed with one or more algorithms for determining the desired beam pattern based at least partly on the information it receives. The processor 38 and controller 20 may be provided as a combined electronic unit or module. Or the sensor 36 may provide information to the processor 38 indirectly via a vehicle ECU. Some sensors may not be dedicated to the headlamp system 10 and may additionally provide information to the ECU or some other processor for other vehicle functions, or the ECU may serve the function of the processor 38. Many variations and arrangements of components are possible for determination of the desired beam pattern based on sensor information and for communication with the controller 20.

Figure 4:
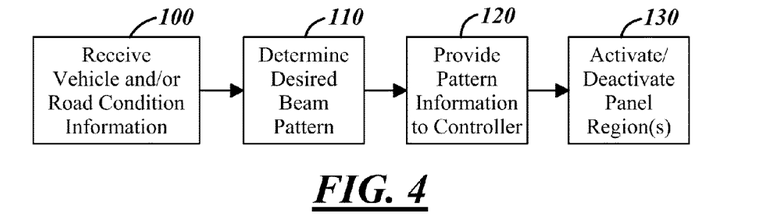
FIG. 4 is a process flow chart showing an exemplary process for changing a beam pattern.

FIG. 4 is a process flow chart showing an example of the steps that may be performed to provide the desired beam pattern at the beam pattern panel. For clarity, the numerals from FIGS. 1-3 are used here when referencing certain system components. In step 100, the processor 38 receives information from the sensor 36, from driver input, and/or from other sources such as the vehicle ECU. In step 110, the processor 38 determines the desired beam pattern to be provided at the panel 18. In step 120, the processor 38 provides information about the desired beam pattern to the panel controller 20. And in step 130, the controller activates and/or deactivates each individually controllable region 34 of the panel 18 as necessary to allow or prevent transmission of light through each region to provide the desired beam pattern. These steps may be performed repeatedly to continuously adapt the beam pattern to the present vehicle situation. Some examples of the types of information the processor 38 may receive and how that information may be used by the processor to determine the appropriate beam pattern are described below.

Referring now to FIGS. 5-10, various examples of beam patterns 40 are illustrated. In each of these figures, the light-emitting side of the beam pattern panel 18 is shown. The panel 18 in these examples includes a plurality of regions 34 that can be changed between opaque and transparent light-transmission states to selectively allow light to pass through the panel. The panel 18 may be an LCD panel, and each individual region 34 may be a liquid crystal element or pixel. The elements 34 are arranged in an array capable of providing a plurality of different beam patterns 40. In these figures, elements 34 are shown lightened when in a transparent state, in which transmission of light through the panel is allowed, while elements in an opaque state are shown darkened. In each case, the beam pattern 40 provided at the panel is defined by the transparent elements. The total number and the size of the individual regions 34 shown in these examples is arbitrary. The size of the individual regions 34 shown in the figures represents approximately 3 to 4 elements per square inch where the illustrated panel 18 represents a panel about 6-inches in diameter. LCD panels are commonly available in much higher pixel densities up to 300 pixels per inch or higher, for example. Higher pixel density has the effect of smoothing the boundaries or edges of the beam pattern, but a low pixel density is shown here for purposes of illustration.

Figure 5:
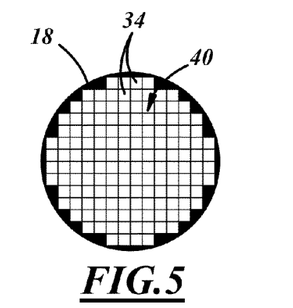
FIG. 5 is a front view of one embodiment of a beam pattern panel having a plurality of regions capable of changing between opaque and transparent light-transmission states.
Figure 6:
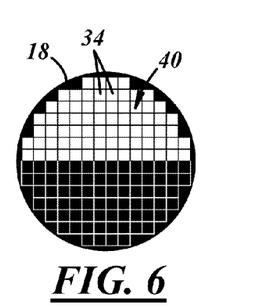
FIG. 6 is a front view of the beam pattern panel of FIG. 5, showing one example of a beam pattern.

The beam patterns 40 shown in FIGS. 5 and 6 are representative of exemplary high- and low- beam settings similar to those described in conjunction with FIGS. 1 and 2. In FIG. 5, all of the individual elements 34 are at the transparent state so that the beam pattern 40 is generally round. In FIG. 6, the lower half of the elements are at the opaque state and the upper half of the elements are at the transparent state so that the beam pattern 40 is approximately semi-circular and located at the upper half of the panel 18. Of course, the illustrated beam patterns are not limited to use with high- and low-beam settings, and beam patterns other than those illustrated may be used with high- and low-beam settings. Indeed, the ability to automatically adapt the beam pattern 40 to the particular vehicle situation in real-time may altogether eliminate the existence of or the distinction between any particular high- or low-beam settings.

Figure 7:
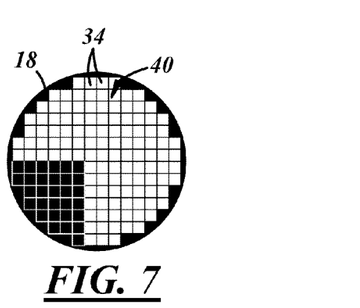
FIG. 7 is a front view of the beam pattern panel of FIG. 5, showing another example of a beam pattern.

For example, FIG. 7 illustrates a beam pattern 40 with no particular symmetry. The illustrated beam pattern 40 is a continuous pattern that is generally located in the upper half and lower right quadrant of the panel 18, as oriented in the figure. When included as the beam pattern panel 18 of the headlamp assembly 12 of FIG. 1, the effect would be similar to a low-beam setting across the entire left-to-right width of the headlamp, with a high-beam effect along only a portion of the width of the headlamp. This may be a useful beam pattern where oncoming traffic is present. For example, the pattern 40 may be configured so that the opaque elements help prevent light emitted by the headlamp assembly from shining directly at the driver of an oncoming vehicle, while continuing to emit light at a higher angle directly in front of the vehicle equipped with the headlamp system taught here. The effect is increased visibility for the driver of the adaptive headlamp vehicle without the blinding effect of traditional high-beam headlamp settings on the drive of the oncoming vehicle.

Figure 8:
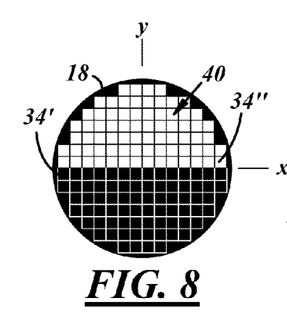
FIG. 8 is a front view of the beam pattern panel of FIG. 5, showing the orientation of the beam pattern of FIG. 6 with respect to x- and y-axes.
Figure 9:
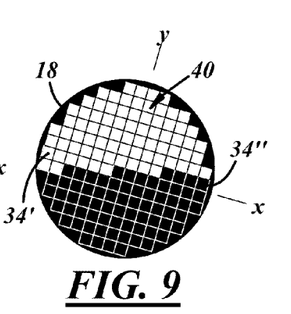
FIG. 9 is a front view of the beam pattern panel of FIG. 8, showing another example of a beam pattern with the axes tilted.
Figure 10:
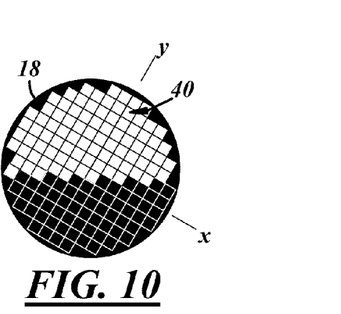
FIG. 10 is a front view of the beam pattern panel of FIG. 8, showing another example of a beam pattern with axes further tilted.

FIGS. 8-10 illustrate beam patterns 40 that may be a function of the tilt angle of the vehicle equipped with the above-described headlamp system. For example, a motorcycle typically leans or tilts to the left or right while turning a corner or driving along a curve in the road, and the beam pattern 40 can adapt to such a change in vehicle orientation. The beam pattern 40 illustrated in FIG. 8 is substantially similar to that of FIG. 6, generally semi-circular at the upper half of the panel 18. FIG. 8 also shows perpendicular x- and y-axes of the headlamp assembly. The x-axis is generally aligned with the horizon when the vehicle is upright and not leaning or tilting right or left, and the y-axis is vertical with respect to the horizon. FIG. 8 also labels some individual elements 34' and 34" of the panel 18. Element 34' is illustrated at the opaque state, and element 34" is at the transparent state.

In FIG. 9, the y-axis is at a different angle than in FIG. 8, representing a tilt of the vehicle and of the headlamp assembly. The beam pattern 40 in FIG. 9 is also different from that of FIG. 8. While the beam pattern 40 remains generally semi-circular and in the upper half of the panel 18 with respect to the horizon, some of the individual changeable regions of the panel are changed from transparent to opaque, or vice-versa, with the changed orientation of the y-axis. In other words, the shape of the beam pattern 40 is generally the same in FIGS. 8 and 9, but the location of the beam pattern 40 is different with respect to the panel 18, making the beam pattern different in FIG. 8 than it is in FIG. 9. For example, individual element 34' is at the opaque state in FIG. 8 and at the transparent state in FIG. 9. Also, individual element 34" is at the transparent state in FIG. 8 and at the opaque state in FIG. 9. The beam pattern 40 shown in FIG. 10 is different than that of FIGS. 8 and 9. The y-axis is tilted further from vertical in FIG. 10 than in FIG. 9. The shape of the beam pattern 40 is generally the same in each of FIGS. 8-10, but the location of the beam pattern relative to the panel 18 is different in each figure, with different elements 34 of the array of elements activated in each figure. This functionality, where the beam pattern 40 retains the same general shape with a changed location along the panel 18, is only one example of how the beam pattern may change in response to a changing vehicle situation.

Figure 11:
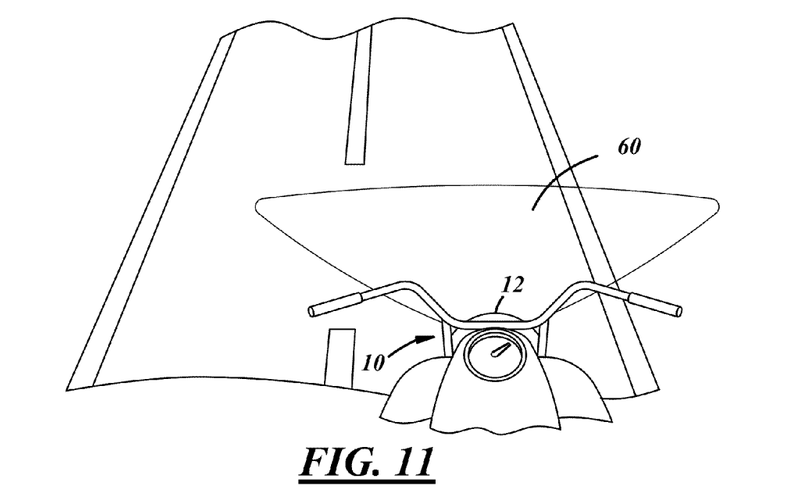
FIG. 11 is a perspective view of a motorcycle equipped with another embodiment of the vehicle headlamp system and travelling along a road.
Figure 12:
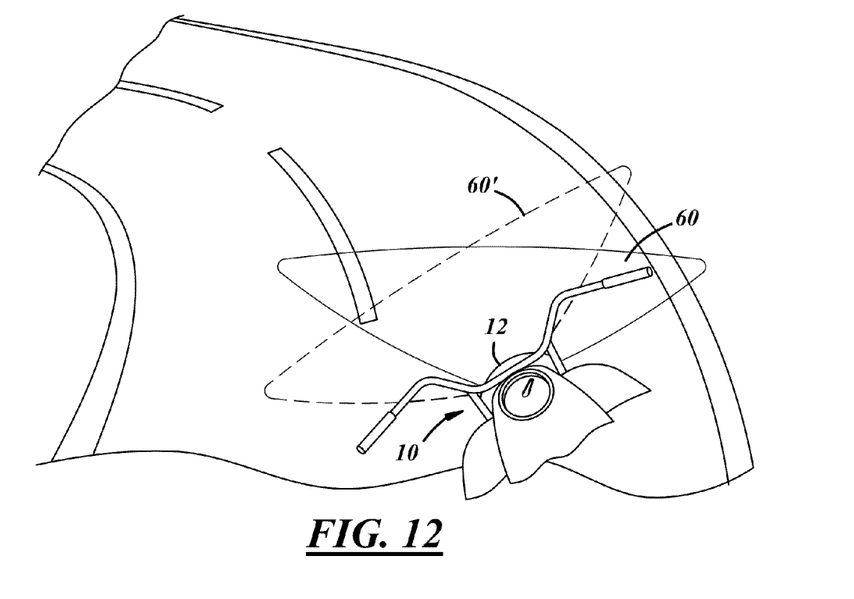
FIG. 12 is a perspective view of the motorcycle of FIG. 11 performing a turning maneuver.

FIGS. 11 and 12 illustrate one potential effect of changing the beam pattern of the headlamp system in response to vehicle orientation. In FIG. 11, the vehicle headlamp system 10 is installed in a motorcycle traveling along a road. The headlamp assembly 12 is installed so that the beam pattern panel tilts together with the motorcycle during motorcycle turning maneuvers. Light is emitted by the headlamp assembly 12 in the form of a projected light beam 60 to illuminate the area in front of the motorcycle. The motorcycle is shown during a turning maneuver in FIG. 12. The projected beam 60 maintains its general alignment with respect to the horizon due at least in part to the beam pattern at the beam pattern panel changing in response to the tilt angle of the motorcycle. The dashed line shows the general shape and direction of the projected beam 60' if a fixed beam pattern is used during the turning maneuver. The projected beam 60 achieved by the above-described vehicle headlamp system 10 can illuminate the road ahead more consistently. The beam 60 can reach further into the inside of the turn, which is more directly in the driver's field of vision.

The example illustrated in FIGS. 11 and 12 is of course non-limiting. For example, the beam pattern provided at the beam pattern panel may change in both location and in shape to customize the shape and direction of the projected beam 60. The beam pattern may be changed during a turning maneuver to direct emitted light even further into the turn, at a steeper angle with respect to the horizon, further away from oncoming traffic, etc. The panel controller of the system 10 may continually receive information about the presently desired beam pattern from a roll or tilt sensor either directly or via a headlamp system processor or other processor.

Figure 13:
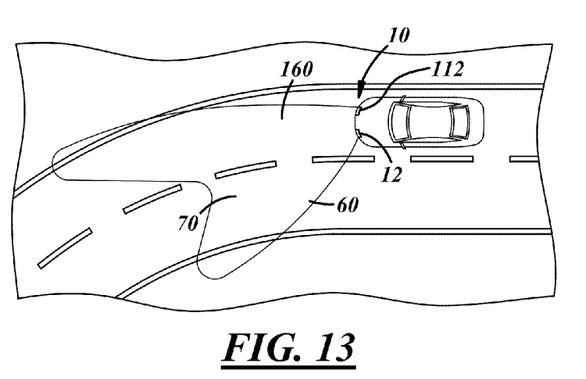
FIG. 13 is a top view of a vehicle equipped with another embodiment of the vehicle headlamp system, showing a projected light beam directed toward a turn in the road.
Figure 14:
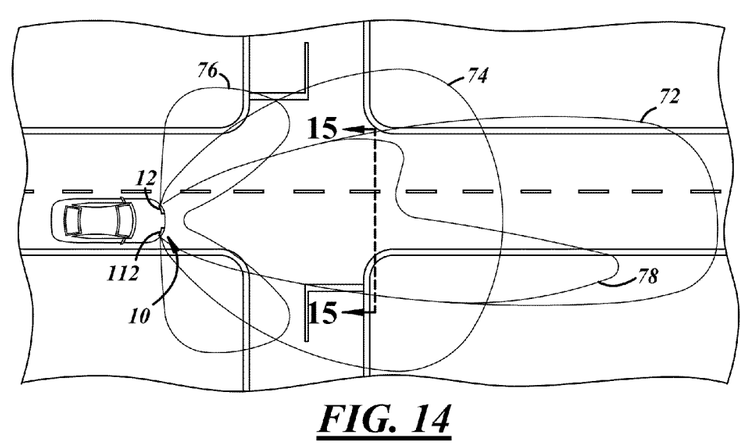
FIG. 14 is a top view of a vehicle equipped with another embodiment of the vehicle headlamp system, showing multiple examples of projected light beams.
Figure 15:
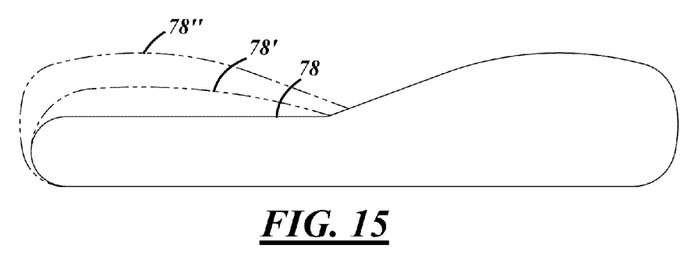
FIG. 15 is a cross-sectional view of one of the projected beams of FIG. 14.

FIGS. 13-15 illustrate various aspects of the disclosed vehicle headlamp system as it may be used with other types of vehicles. In one embodiment, the headlamp system 10 includes first and second headlamp assemblies 12, 112, as shown in FIGS. 13 and 14. One or both of the headlamp assemblies 12, 112 may be constructed with an adaptable beam pattern as described above. Where both assemblies 12, 112 include beam pattern panels with a region or regions that can be changed between opaque and transparent light-transmission states, the changeable region(s) of one headlamp assembly may be controlled independently from the other. In this manner, each headlamp assembly 12, 112 can emit a projected light beam 60, 160 that is either the same as or different from the other.

The projected light beams 60, 160 may at least partially overlap to form a composite projected beam 70, as shown in FIG. 13. The beam pattern panel of each headlight assembly 12, 112 can provide a beam pattern that is the same as or different from the beam pattern of the other to achieve the desired shape and direction of the composite projected beam 70. In the example illustrated in FIG. 13, where the vehicle is entering a curve or turn in the road ahead, the respective beam pattern panels provide beam patterns that direct the projected beam 70 into the turn rather than straight ahead. In addition, the portion of the beam 70 nearest the oncoming traffic lane may be directed at a more downward or shallower angle with respect to the horizon so that it is less likely to shine directly at the drive of an oncoming vehicle. The headlamp system processor may determine the desired beam pattern for each headlamp assembly based on information received from a turning angle sensor, an accelerometer, GPS information, or other information indicating a turn in the road. The processor may also take other information into account, such as information from an oncoming light sensor, vehicle speed, weather conditions, or other information indicating other conditions that may dictate changes in the desired beam patterns and projected beam other than a directional change of the projected beam into the turn.

FIG. 14 illustrates additional examples of composite projected light beams 72-78 of various shapes and directions, each attainable from the same headlight assemblies 12, 112 when constructed according to the present teachings. Composite beam 72 may be similar to a beam provided by a conventional high-beam setting. This beam configuration may be particularly suitable for use on a motorway or divided highway, where light directed at the height of oncoming traffic is not as problematic because the oncoming traffic is not within the width of the projected beam 72. Composite beam 74 may be similar to a beam provided by a conventional low-beam setting, where the beam is more downwardly directed than beam 72 and may be wider as well. This beam configuration may be suitable for city driving, where oncoming traffic is often present and it is useful to direct the beam lower to avoid blinding oncoming drivers. More ambient light is typically available in city or urban driving, which may also be at a slower pace, and illuminating the road further from the vehicle may not be as necessary or as helpful as on a motorway or in rural areas. Composite beam 76 is a wider-angle beam configured to illuminate areas very near the front corners of the vehicle. The beam configuration may be useful for use at junctions or intersections, where the vehicle may be travelling slowly and the driver may have a need to be alerted to the presence of pedestrians, street signs, or other objects off to the side of the vehicle. Composite beam 78 is non-symmetric with a portion of the beam directed toward the lane directly ahead in a manner similar to a high-beam setting (or a motorway setting, as with beam 72), and another portion of the beam directed toward the oncoming lane of travel in a manner similar to a low-beam setting (or a city driving setting, as with beam 74).

The vehicle headlamp system 10 may be configured so that each of these examples of projected beams 72-78 is user selectable or automatically selected by the system controller or both. For example, the system processor may select a beam pattern to be provided at the beam pattern panel of each headlight assembly to produce projected beam 72 when it receives information indicating low ambient light conditions, high vehicle speed, the absence of oncoming traffic, the absence of traffic directly in front of the vehicle, driver input, and/or other information indicating that projected beam 72 is appropriate. In another example, the system processor may select a beam pattern to be provided at the beam pattern panel of each headlight assembly to produce projected beam 74 when it receives information indicating high ambient light conditions, low vehicle speed, the presence of oncoming traffic or traffic directly in front of the vehicle, driver input, and/or other information indicating that projected beam 74 is appropriate. The system processor may select beam patterns to produce projected beam 76 when it receives information indicating high ambient light conditions, very low or no vehicle speed, turn signal actuation, driver input, and/or other information indicating that projected beam 76 is appropriate. And the system processor may select beam patterns to produce projected beam 78 when it receives information indicating low ambient light conditions, moderately high vehicle speed, the presence of oncoming traffic, the absence of traffic directly in front of the vehicle, driver input, and/or other information indicating that projected beam 78 is appropriate. These are only a few examples of manners in which the vehicle headlamp system may adapt to different vehicle situations.

In one embodiment, the headlamp system may operate in an automatic mode to continually monitor a road or vehicle condition and change the beam pattern as the monitor condition changes. Where the monitored condition begins to change and continues to change, the beam pattern can also continually change to affect the projected light beam. One example of this functionality was described in conjunction with FIGS. 8-12, where the beam pattern 40 is changed in real time to correspond with the changing tilt angle of a motorcycle performing a turning maneuver. Another example may be described with reference to FIG. 14 and FIG. 15.

FIG. 15 is a cross-sectional view of the projected light beam 78 of FIG. 14. In this example, the projected light beam 78 changes in response to a changing condition. More particularly, the beam pattern panel of at least one of the headlamp assemblies 12, 112 changes with the approach of an oncoming vehicle. The beam 78 as shown in FIGS. 14 and 15 accounts for the presence of an oncoming vehicle, which is to say that the portion of the beam directed toward the oncoming lane of travel is directed generally low enough to avoid shining onto the windshield of an oncoming vehicle. But oftentimes oncoming traffic is intermittent, being present only every several minutes while the oncoming lane is empty a majority of the time. With conventional headlamp assemblies, the vehicle operator may use a high-beam setting during these times where no traffic is present, but must remember to manually change to the low-beam setting when oncoming traffic is present.

The above-described vehicle headlamp system may be configured to emit a beam similar to beam 72 of FIG. 14 as the default beam and to shift the angle of a portion of projected beam below the windshield of an oncoming vehicle only when such a vehicle is present. Further, the system may be equipped to continually change the beam pattern and the resulting projected beam as a function of the distance to the oncoming vehicle. For example, the distance to the oncoming vehicle may be determined by information provided by a vision system, an oncoming light sensor that is intensity-sensitive, or RF, IR, or laser sensing systems. The system controller can change the beam pattern at the beam pattern panel in real time to ensure that the projected beam is directed sufficiently low as the oncoming vehicle approaches, then return the beam pattern to its default configuration to direct the projected beam higher and further in front of the vehicle after the oncoming vehicle has passed. By way of example and with reference to FIG. 15, the default projected beam 78" is emitted by the headlamp system when no oncoming traffic is present. When an oncoming vehicle is detected, the distance to the oncoming vehicle is monitored, and the beam pattern is changed to direct the projected beam lower as the distance decreases. While the oncoming vehicle is sufficiently far away, projected beam 78" is emitted. Projected beams 78' and 78 are subsequently emitted when the oncoming vehicle is sufficiently close that a beam directed any higher in the oncoming lane would risk blinding the driver of the oncoming vehicle. The illustrated beam cross-sections only represent discreet moments in time and particular projected beams and beam patterns at those moments, as an electronically controlled beam pattern may assume hundreds of different configurations as it changes with the approach of an oncoming vehicle or other factors.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle headlamp system comprising first and second headlamp assemblies, each headlamp assembly comprising:
    a housing;
    a light source that provides light inside the housing; and
    an LCD panel at a fixed location relative to the housing, the panel having a light-receiving side positioned to receive light from the light source, wherein the panel includes a liquid crystal element that can be changed between opaque and transparent light-transmission states to selectively allow light to pass through the panel, wherein liquid crystal elements of each headlamp assembly are configured to be activated independently from each other.

2. A vehicle headlamp system as defined in claim 1, wherein each panel includes a plurality of liquid crystal elements that can be changed between opaque and transparent light-transmission states to selectively allow light to pass through the panel.

3. A vehicle headlamp system as defined in claim 1, wherein the liquid crystal elements of each headlamp assembly are arranged in an array capable of providing a plurality of beam patterns.

4. A vehicle headlamp system as defined in claim 1, wherein each headlamp assembly further comprises:
    a lens positioned to receive light originating from the light source and configured to change the direction of at least some of the received light before the light is emitted from the headlamp assembly.

5. A vehicle headlamp system as defined in claim 1, wherein each liquid crystal element is configured to be changed by a headlamp system controller that receives information about the desired light-transmission state of said liquid crystal element.

6. A vehicle headlamp system as defined in claim 1, wherein each panel is positioned so that at least some of the light from the respective light source bypasses the panel.

7. A headlamp assembly for use with a vehicle headlamp system, comprising:
    a housing;
    a light source that provides light inside the housing; and
    an LCD panel comprising one or more liquid crystal elements, wherein each of the elements is configured to be activated to allow or prevent transmission of light from the light source through the panel at the activated element(s),
    wherein the panel is positioned so that at least some of the light from the light source impinges the panel and some of the light from the light source bypasses the panel, and
    wherein more light passes through the LCD panel when the headlamp assembly is at a high-beam setting than when the headlamp assembly is at a low-beam setting.

8. A headlamp assembly as defined in claim 7, wherein each of the elements prevents the transmission of light when activated.

9. A headlamp assembly as defined in claim 7, wherein the LCD panel comprises a plurality of liquid crystal elements arranged in an array capable of providing a plurality of different beam patterns.

10. A vehicle headlamp system comprising the headlamp assembly of claim 9, the system further comprising:
    a controller configured to receive information about the desired beam pattern and to activate or deactivate each liquid crystal element to provide the desired beam pattern; and
    a sensor that monitors a vehicle or road condition and provides information about the condition to a processor for determination of the desired beam pattern.

11. A vehicle headlamp system as defined in claim 10, wherein the sensor is a roll sensor, a turning angle sensor, an oncoming light sensor, an accelerometer, a vision system, or a road hazard sensor.

12. A vehicle headlamp system comprising first and second headlamp assemblies, each according to claim 7, wherein the liquid crystal elements of each headlamp assembly are configured to be activated independently from each other.

13. A method of operating a vehicle headlamp system, comprising the steps of:
    (a) directing light from a light source of a headlamp assembly toward an LCD panel so that at least some of the light impinges the panel;
    (b) receiving information at a headlamp system controller about a desired beam pattern for the panel; and
    (c) changing the light-transmission state of one or more liquid crystal elements of the LCD panel to provide the desired beam pattern,
    wherein the desired beam pattern is a first desired beam pattern of a first headlamp assembly and is different from a second desired beam pattern of second headlamp assembly of the headlamp system.

14. The method of claim 13, further comprising the steps of:
    using a sensor to monitor a road or vehicle condition; and
    determining the desired beam pattern based at least in part on the monitored condition.

15. The method of claim 13, wherein the vehicle headlamp system is installed in a motorcycle so that the LCD panel tilts together with the motorcycle during motorcycle turning maneuvers and the location of the beam pattern with respect to the LCD panel changes during the turning maneuver.

16. The method of claim 13, further comprising the steps of:
    directing light from the light source toward the LCD panel so that some of the light impinges the panel and some of the light bypasses the panel; and allowing more light to pass through the LCD panel when the desired beam pattern corresponds to a high-beam setting than when the desired beam pattern corresponds to a low-beam setting.

17. The method of claim 13, further comprising the steps of:
  detecting the presence of an oncoming vehicle; and
  changing the light-transmission state of one or more liquid crystal elements of the LCD panel to reduce the amount of light directed at the driver of the oncoming vehicle.

* * * * *